United States Patent [19]

Clapper

[11] Patent Number: 4,807,779

[45] Date of Patent: Feb. 28, 1989

[54] TAMPER-PROOF DISPLAY AND DISPENSING APPARATUS

[75] Inventor: Robert C. Clapper, Glendale, Wis.

[73] Assignee: DCI Marketing, Milwaukee, Wis.

[21] Appl. No.: 889,476

[22] Filed: Jul. 25, 1986

[51] Int. Cl.[4] ............................................ B65G 59/06

[52] U.S. Cl. ........................................ 221/92; 312/42

[58] Field of Search ...................... 221/91, 92, 93, 94, 221/112, 125-128, 131, 133, 306; 312/42, 117, 133 R, 304; 211/49.1, 59.2; 133/6; 222/485; 206/538, 536

[56] References Cited

U.S. PATENT DOCUMENTS

| | | | |
|---|---|---|---|
| 2,463,283 | 3/1949 | Kaufman et al. | 312/304 X |
| 2,689,159 | 9/1954 | Schmitz et al. | 312/117 X |
| 2,986,304 | 5/1961 | Barnhart | 221/125 |
| 3,804,480 | 4/1974 | Chamberlin | 312/42 X |
| 4,007,853 | 2/1977 | Bahneman | 221/3 |

FOREIGN PATENT DOCUMENTS

| | | | |
|---|---|---|---|
| 513979 | 5/1954 | Belgium | 221/133 |

*Primary Examiner*—F. J. Bartuska

*Attorney, Agent, or Firm*—Michael, Best & Friedrich

[57] ABSTRACT

A cigarette carton display and dispensing apparatus comprising a cabinet having herein an elongated opening having a longitudinal axis and a length along said longitudinal axis, and a door having a length substantially less than the length of the elongated opening and an access opening in the door. The door is mounted on the cabinet so that the door only partially covers the elongated opening so that the door is reciprocally slidable along the longitudinal axis to selectively expose cigarette cartons for removal.

4 Claims, 1 Drawing Sheet

TAMPER-PROOF DISPLAY AND DISPENSING APPARATUS

BACKGROUND OF THE INVENTION

The invention relates to dispensing apparatus, and, more particularly, to point-of-purchase display and dispensing apparatus. Still more particularly, the invention relates to such apparatus for displaying and dispensing cartons of cigarettes.

Known apparatus of this type typically include a cabinet containing vertical columns of cartons of cigarettes and having a transparent front wall which leaves the bottom row of cartons exposed for removal. Because the entire bottom row can be pulled from the apparatus at one time, it is easy for a thief to quickly grab a substantial number of cigarette cartons. Known apparatus permit the removal of five or six cartons at one time.

SUMMARY OF THE INVENTION

The invention provides a cigarette carton display and dispensing apparatus which solves the above-noted problem of theft by permitting the removal of a limited number of cigarette cartons at any one time. Like the above-described apparatus, the apparatus of the invention comprises a cabinet or housing means for containing several columns of cigarette cartons. The cabinet has a transparent front wall with a lower edge located above the bottom row of cartons and defining an opening affording access to the bottom row of cartons.

In order to prevent removal of the entire bottom row at one time, the apparatus also comprises a sliding door mounted in the opening for affording access to some of the cartons in the bottom row while preventing access to the remainder of the cartons. In the preferred embodiment, the sliding door has therein a pair of spaced-apart access openings, each for affording access to one carton. Furthermore, in the preferred embodiment, the sliding door has a length less than the length of the opening so that when the sliding door is moved all the way to one side of the cabinet, the carton on the other side of the cabinet is not covered by the sliding door and is therefore removable. Thus, cartons can only be removed one at a time from discrete and separated areas through the sliding door. Preferably, the sliding door includes upper and lower generally horizontal edges, and the cabinet includes channel means slidably receiving each of these edges.

Other principal features and advantages of the invention will become apparent to those skilled in the art upon review of the following detailed description, claims, and drawings.

Figure 1:
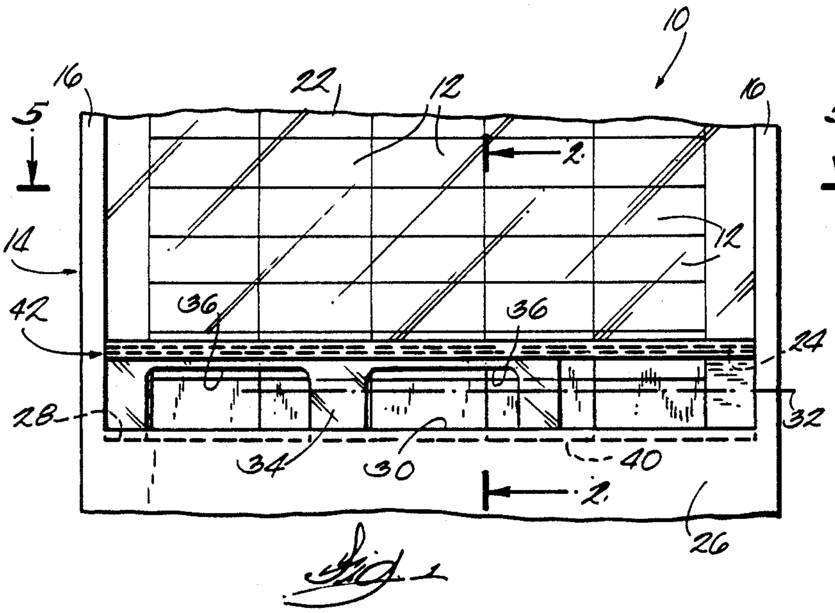
FIG. 1 is a partial front view of a display and dispensing apparatus embodying the invention.

Before the illustrated embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A display and dispensing apparatus 10 embodying the invention is illustrated in the drawings. As best shown in FIG. 1, the apparatus 10 comprises housing means for containing a plurality of columns of articles, preferably cartons 12 of cigarettes, to be dispensed. In the illustrated construction, the housing means includes a cabinet 14 which contains five columns of cigarette cartons 12. The cabinet 14 includes opposed, generally vertical side walls 16 partially defining the space in which the cartons 12 are located, and a generally horizontal wall 18 extending between the side walls 16 for supporting the cartons 12. In the preferred embodiment, the cabinet 14 also includes a storage space 20 (shown partially in FIG. 2) located beneath the horizontal wall 18.

Figure 2:
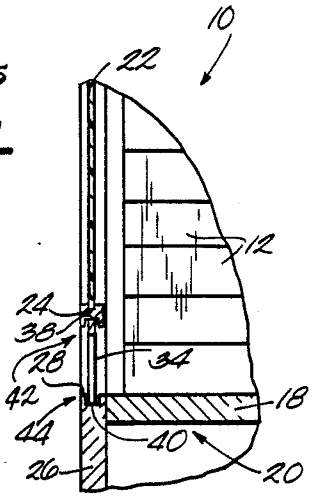
FIG. 2 is a cross-sectional view taken along Line 2—2 in FIG. 1.

The cabinet 14 also includes a transparent, generally vertical upper front wall 22 extending between the side walls 16 and defining the front of the space in which the cartons 12 are located. As best shown in FIGS. 1 and 2, the upper front wall 22 has a generally horizontal lower edge 24 located above the bottom row of cartons 12 so that the upper front wall 22 does not overlap or cover the bottom row of cartons 12. The cabinet 14 further includes a lower front wall 26 extending between the side walls 16 and having a generally horizontal upper edge 28 located at a level beneath the bottom row of cartons 12 and preferably coplanar with the upper surface of the horizontal wall 18. As a result, the lower edge 24 of the upper front wall 22 and the upper edge 28 of the lower front wall 26 define an elongated opening 30 having a generally horizontal longitudinal axis 32 and a length (the horizontal dimension) in the direction of the longitudinal axis 32, and the opening 20 affords access to a first predetermined number of the cartons 12, i.e., the five cartons in the bottom row of cartons.

The apparatus 10 also comprises manually operable means for selecting a second predetermined number of cartons 12 and for affording access to the second predetermined number of cartons while preventing access to the remainder of the cartons, with the second number being less than the first number (five). In other words, the manually operable means affords access to some of the cartons 12 in the bottom row while preventing access to the remainder of the cartons in the bottom row. While various suitable manually operable means can be used, in the preferred embodiment, the manually operable means includes a door 34, and means for mounting the door 34 on the housing means or cabinet 14 so that the door 34 at least partially covers the elongated opening 30 and so that the door 34 is reciprocally slidable along the longitudinal axis 32 of the opening 30, or horizontally across the opening 30.

In the preferred embodiment, the door 34 has a length substantially less than the length of the elongated opening 30 so that if the door 34 is moved all the way to one side of the opening 30, the carton 12 in the bottom row on the other side of the opening 30 is uncovered by the door 34 and is therefore removable. Preferably, the door 34 is transparent and can be made of the same material (e.g., plexiglass) as the upper front wall 22. Also, the door 34 has therein a pair of spaced apart access openings 36 each for affording access to one of the cartons 12 in the bottom row. As best shown in FIG. 1, each of the access openings 36 has a length (the horizontal dimension) substantially less than the length of the elongated opening 30 and substantially less than the length of the door 34. More particularly, each of the access openings 36 has a length greater than the width (the horizontal dimension) of one of the cartons 12 but shorter than the width of two of the cartons, so that only one carton 12 can be removed through an access opening 36.

The door 34 includes opposite, generally horizontal upper and lower edges 38 and 40 respectively adjacent the lower edge 24 of the upper front wall 22 and the upper edge 28 of the lower front wall 26. While various suitable means can be employed for mounting the door 34, in the preferred embodiment, the mounting means includes first means for slidably securing the upper edge 38 of the door 34 to the lower edge 24 of the upper front wall 22, and second means for slidably securing the lower edge 40 of the door to the upper edge 28 of the lower front wall 26. Preferably, the first securing means includes channel means 42 located on the lower edge 24 of the upper front wall 22 for slidably receiving the upper edge 38 of the door 34, and the second securing means includes channel means 44 on the upper edge 28 of the lower front wall 26 for slidably receiving the lower edge 40 of the door 34.

Figure 3:
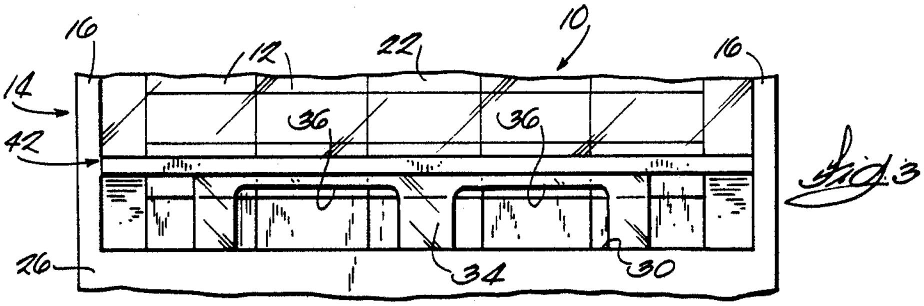
FIG. 3 is a view similar to FIG. 1 showing the sliding door in its middle position.
Figure 5:
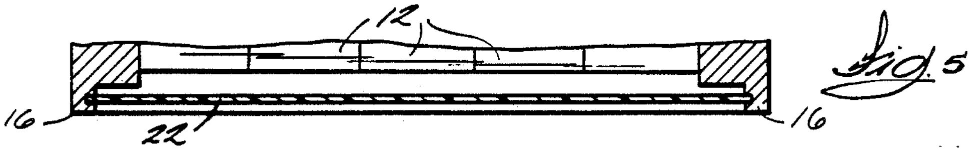
FIG. 5 is a cross-sectional view taken along Line 5—5 in FIG. 1.
Figure 4:
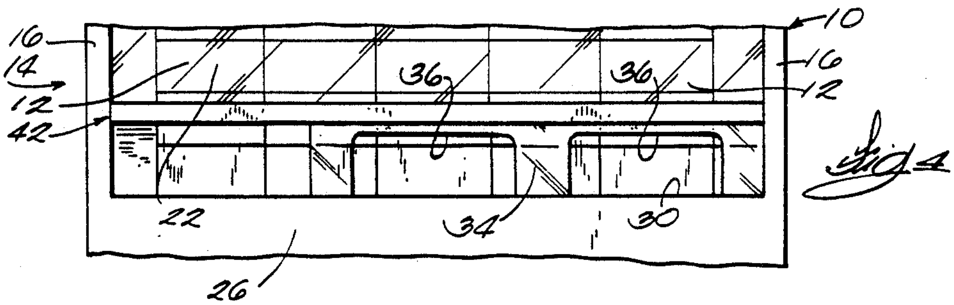
FIG. 4 is a view similar to FIG. 3 showing the sliding door in its right position.

The door 34 is slidable between a left position shown in FIG. 1, a middle position shown in FIG. 3, and a right position shown in FIG. 4. In the left position (FIG. 1), the door 34 affords access to the first, third and fifth cartons, counting from left to right. The left access opening 36 allows removal of the first carton, the right access opening 36 allows removal of the third carton, and the entire door 34 is located to the left of the fifth carton, thereby allowing removal of the fifth carton. The door 34 prevents removal of the second and fourth cartons. In the middle position (FIG. 3), the left and right access openings 36 respectively afford access to the second and fourth cartons. The door 34 prevents removal of the first, third and fifth cartons. In the right position (FIG. 4), the door 34 affords access to the first and fifth cartons. The right access opening 36 allows removal of the fifth carton, the left access opening 36 allows removal of the third carton, and the entire door 34 is located to the right of the first carton, thereby allowing removal of the first carton. The door 34 prevents removal of the second and fourth cartons.

Various features and advantages of the invention are set forth in the following claims.

I claim:

1. A dispensing apparatus comprising housing means for containing a plurality of aligned articles, said housing means having therein an elongated opening aligned with the articles for affording access to the articles, said elongated opening having a longitudinal axis, a length, and opposite first and second ends, and a door mounted for movement axially of said elongated opening, said door having opposite first and second ends and a length less than said length of said elongated opening, said door having therein a plurality of access openings each of which affords access to only one of the articles, said door being movable to a first position wherein said first end of said door is located adjacent said first end of said elongated opening, wherein said door uncovers a first portion of said elongated opening adjacent said second end of said elongated opening such that an article is removable through said first portion of said elongated opening, wherein each of said access openings is aligned with and affords removal of an article, and wherein said door covers and prevents removal of at least one article, and said door being movable to a second position wherein said second end of said door is located adjacent said second end of said elongated opening, wherein said door uncovers a second portion of said elongated opening adjacent said first end of said elongated opening such that an article is removable through said second portion of said elongated opening, wherein each of said access openings is aligned with and affords removal of an article, and wherein said door covers and prevents removal of at least one article.

2. A dispensing apparatus as set forth in claim 1 wherein said housing means includes opposed first and second edges extending generally parallel to said longitudinal axis and defining opposite sides of said elongated opening, wherein said door includes opposite first and second edges extending generally parallel to said longitudinal axis and respectively adjacent said first and second edges of said housing means, and wherein said apparatus further includes first means for slidably securing one of said first edges to the other of said first edges, and second means for slidably securing one of said second edges to the other of said second edges.

3. A dispensing apparatus as set forth in claim 2 wherein said first securing means includes first channel means on one of said first edges for slidably receiving the other of said first edges, and wherein said second securing means includes second channel means on one of said second edges for slidably receiving the other of said second edges.

4. A dispensing apparatus as set forth in claim 3 wherein said first channel means is located on said first edge of said housing means, and wherein said second channel means is located on said second edge of said housing means.

* * * * *